United States Patent [19]

Kerschner, III

[11] 4,254,408
[45] Mar. 3, 1981

[54] CASE FOR LUMINOUS DISPLAY WITH AMBIENT LIGHT CONDUIT ASSEMBLY

[75] Inventor: William J. Kerschner, III, Flint, Mich.

[73] Assignee: General Motors Corporation, Detroit, Mich.

[21] Appl. No.: 99,885

[22] Filed: Dec. 3, 1979

[51] Int. Cl.³ .............................................. G08B 5/36
[52] U.S. Cl. ................................. 340/366 B; 340/380
[58] Field of Search ............... 340/366 B, 201 P, 380; 368/239

[56] References Cited

U.S. PATENT DOCUMENTS

| | | | |
|---|---|---|---|
| 3,578,973 | 5/1971 | Dooley | 250/77 X |
| 3,747,323 | 7/1973 | Eckenrode | 58/50 R |
| 3,974,637 | 8/1976 | Bergey | 58/50 R |

*Primary Examiner*—Harold I. Pitts
*Attorney, Agent, or Firm*—Robert M. Sigler

[57] ABSTRACT

A containing case for a luminous display in a motor vehicle instrument panel wherein the display brightness may be controlled according to ambient light intensity includes a generally opaque cover member having a window with an opaque tube extending backward therefrom and a base member including a photosensitive device in a cup having an open axial end adapted to project into the open end of the tube, so that the interior of the tube and cup are optically isolated from the display. The tube has an inner diameter which tapers outwardly toward its open end. A light conducting conduit member has a step-down diameter end portion adapted for retention in the cup and a main portion having a diameter which is at least as large as the cup outer diameter adjacent the cup but tapers to fit the tube inner diameter along its axial length. The conduit member thus functions both as a conduit for ambient light from the window to the photosensitive device and as an aid in aligning the base and cover members during assembly.

1 Claim, 3 Drawing Figures

U.S. Patent
Mar. 3, 1981
4,254,408
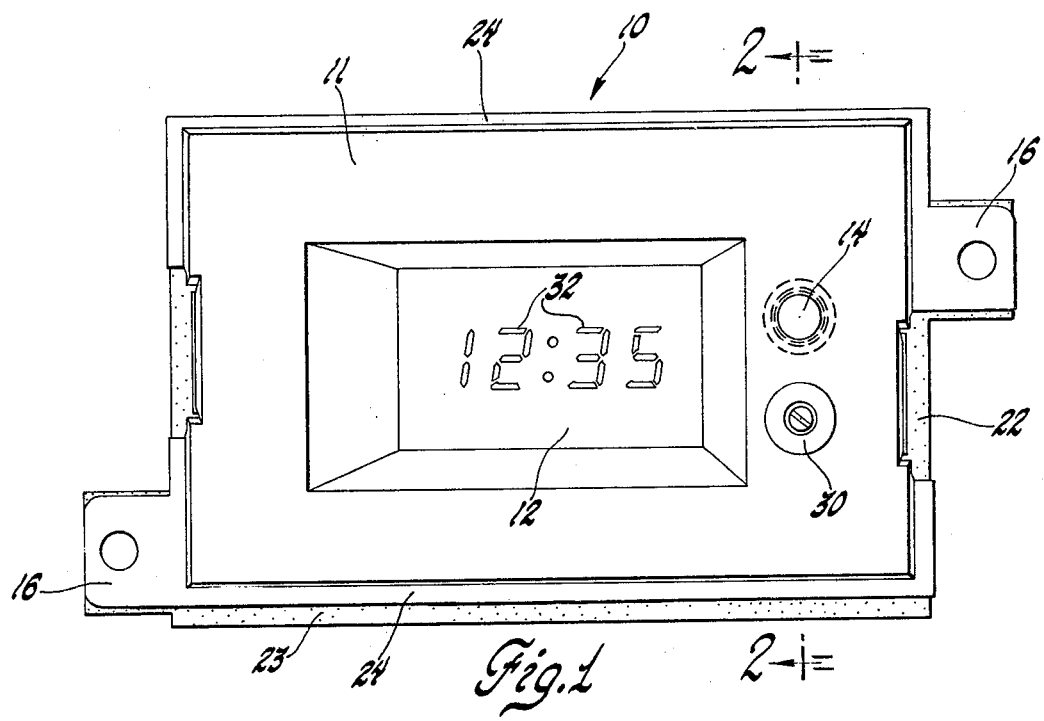
Fig.1
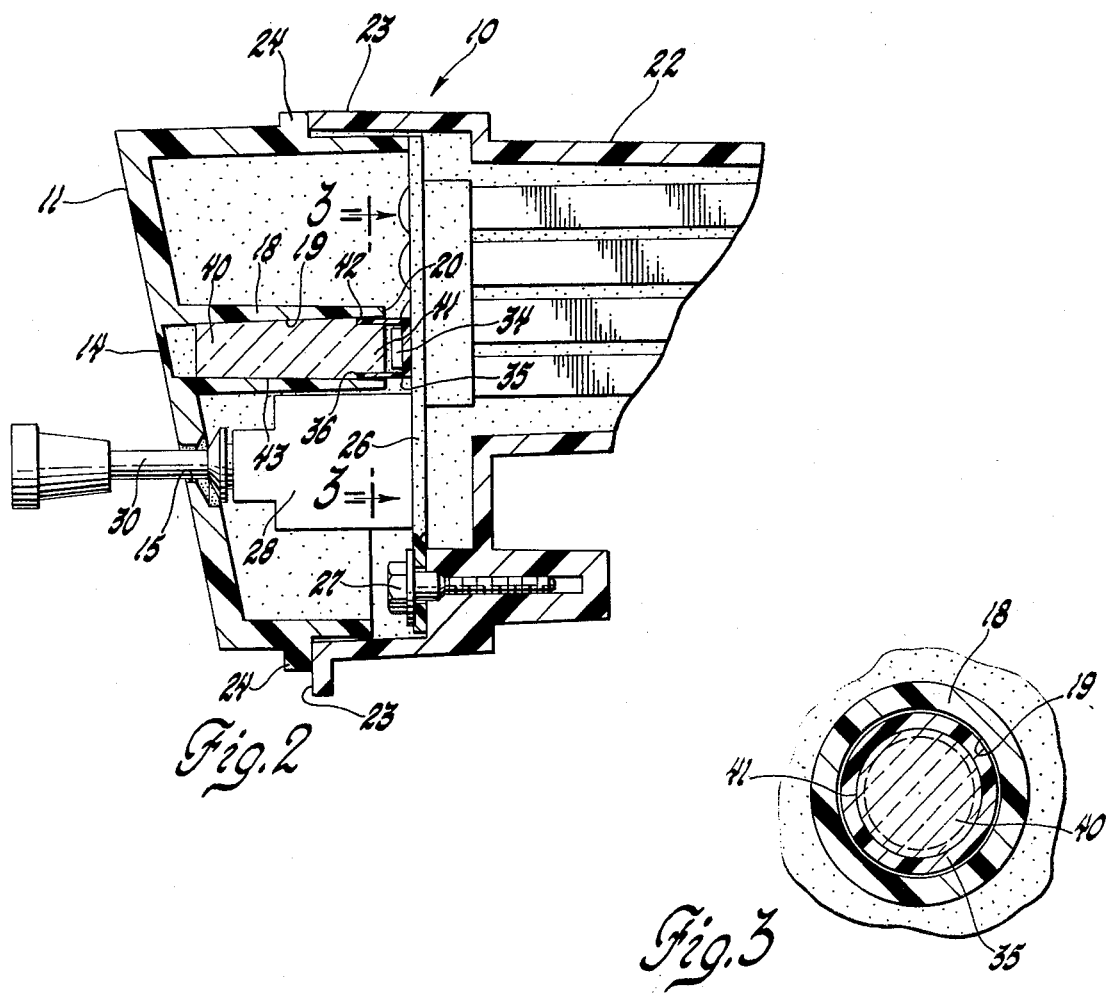
Fig.2
Fig.3

CASE FOR LUMINOUS DISPLAY WITH AMBIENT LIGHT CONDUIT ASSEMBLY

BACKGROUND OF THE INVENTION

This invention relates to a containing case for a luminous display for use in a motor vehicle instrument panel and particularly to such a case wherein the display brightness may be controlled according to ambient light intensity.

The use of luminous digital displays, in which numbers are formed by the powering of selected fluorescent tubes, light emitting diodes or similar devices, is increasing in many devices which include numerical displays. The use of such displays is beginning to be seen in motor vehicle instrument panels; although the great range of ambient light conditions encountered by a vehicle operator makes it desirable to have some form of brightness control for the display. Ideally, in daylight, such brightness control would be capable of responding to ambient light conditions to smoothly vary the display brightness in accordance therewith.

Thus there is a need, in such devices, for apparatus capable of sensing the ambient light level outside the case in which the lighted display is contained and communicating such light intensity information to an appropriate device in the electrical circuitry which controls the display brightness. Such apparatus must accurately and reliably convey the ambient light intensity information without being substantially affected by the light of the display itself and should ideally be nonelectrical in nature so that all electrical components may be confined to one or more electrical circuit boards within the case. It would also, ideally, be capable of being formed directly in the case itself with a minimum number of added parts to reduce cost. In addition, such apparatus should not unduly complicate the assembly of the device.

SUMMARY OF THE INVENTION

Therefore, it is an object of this invention to provide a containing case for a luminous display in a motor vehicle instrument panel in which ambient light information may be conveyed from outside the case to display brightness controlling apparatus within the case while maintaining such information substantially unaffected by the display itself.

It is a further object of this invention to provide such a case including an ambient light conduit assembly capable of conveying ambient light from without the case to a point within the case, the assembly being formed from the case itself and a minimum number of simple added mechanical parts.

It is yet another object of this invention to provide such a case in which the ambient light conduit assembly does not unduly complicate assembly of the case.

These and other objects are realized in a case for a luminous display which includes a generally opaque cover member having an opaque tube extending from the back thereof and an ambient light admitting window opening to the interior of said tube, the tube having an outwardly tapering inner diameter. A base member includes a photosensitive device in a cup having an open axial end adapted for insertion in the open end of the tube when the cover and base members are assembled so that the interior of the tube and cup are isolated optically from the display. A light conducting conduit member has a step-down diameter end portion adapted for retention in the cup and a main portion having a diameter at least as large as the cup outer diameter adjacent the cup and tapering to fit the tube inner diameter along its axial length. This apparatus thus conveys ambient light from without the case to the photosensitive device within the case while isolating such photosensitive device from the display itself. The light conducting assembly is formed from the case members themselves with one added part; and, not only does it not unduly complicate assembly of the case, but it includes features which aid in alignment of the cover and base members during assembly. Further details and advantages of this invention will be apparent from the accompanying drawings and following description of a preferred embodiment.

SUMMARY OF THE DRAWINGS

FIG. 1 shows a front elevational view of a device according to this invention for use in a motor vehicle instrument panel.

FIG. 2 shows a section view along lines 2—2 in FIG. 1.

FIG. 3 shows a section view along lines 3—3 in FIG. 2.

DESCRIPTION OF THE PREFERRED EMBODIMENT

Although this invention may be used in a variety of display devices in a motor vehicle instrument panel, it is shown in this embodiment in the form of a digital clock. Referring to FIG. 1, clock 10 has a front cover member 11 which may be formed of a neutral density, semi-transparent plastic, the opacity of which varies with the wall thickness thereof. As seen in FIG. 2, the thickness of the cover member 11 in most places is sufficient to make that member essentially opaque, although thinner walled, essentially transparent sections may be provided, as shown in FIG. 1, in the form of a rectangular viewing window 12 for the luminous digital display and an ambient light admitting window 14. The display viewing window 12 is recessed from the surrounding opaque portions of cover member 11 and in particular that portion which surrounds ambient light admitting window 14. Thus, light from the display does not enter ambient light emitting window 14 in any appreciable amount. Cover member 11 further includes an opening 15 for a control knob and a pair of ears 16 having means adapted for mounting the clock 10 in a motor vehicle instrument panel.

Referring to FIG. 2, cover member 11 further includes an opaque tube 18 which extends inwardly therefrom around the ambient light admitting window 14. Thus, ambient light admitting window 14 admits light only to the interior of tube 18. Tube 18 further has an inner diameter 19 which tapers outwardly along the length of tube 18 from window 14 to the open end 20 of tube 18. Clock case 10 further comprises a base member 22 having an open end 23 which abuts a flange 24 of cover member 11. Base member 22 includes an electrical circuit board 26 which may be fixed to base member 22 by means of one or more screws 27. On electrical circuit board 26 are mounted all electrical circuit elements and controls of the clock including a control switch 28 having an actuator knob 30 projecting through opening 15, display fluorescent tubes 32, and the electrical circuitry, not shown, adpated to maintain the correct time and actuate the fluorescent tubes 32.

The aforementioned circuitry includes circuitry adapted to control the brightness of the fluorescent tubes 32 and specifically includes a photosensitive device 34 mounted in a cup 35 having an open end 36. Cup 35 is axially aligned with tube 18 when cover member 11 and base member 22 are assembled together; and the length and inner diameter at the open end of tube 18 are such that tube 18 overlaps cup 35 to optically isolate photosensitive device 34 from the interior of clock case 10 including display tubes 32. Photosensitive device 34 is thus exposed only to ambient light entering tube 18 through ambient light admitting window 14.

In order to more efficiently convey light from window 14 to photosensitive device 34, a light conducting conduit member 40 is provided in tube 18. Conduit member 40 extends substantially from window 14 to photosensitive device 34 and includes, adjacent photosensitive device 34, a step-down diameter end portion 41 which fits inside the open end 36 of cup 35. The remainder 43 of conduit member 40 is tapered in diameter to match the taper of the inner diameter 19 of tube 18, the tapered portion 43 being at least as large in diameter as the outer diameter of cup 35 adjacent the open end 36 of cup 35 and becoming narrower as window 14 is approached. A step flange 42 is thus formed in conduit member 40 where step-down diameter end portion 41 meets tapered portion 43.

During final assembly of the clock case 10, the base member 22 with its attached electrical circuit board 26 may be oriented with its open end vertically upward. Conduit member 40 may thus be dropped into cup 35 so that it rests with its step flange 42 on the open end 36 of cup 35 and points vertically upward. Since conduit member 40 projects upward from the main portion of base member 22, it serves as a locator, by means of tube 18, for cover member 11 as it is lowered onto base member 22. Due to the taper of tube 18 and conduit member 40, there is ample clearance between conduit member 40 and open end 20 of tube 18 as the former enters the latter. In addition, since conduit member 40 has a diameter adjacent cup 35 at least as great as the outer diameter of cup 35, the open end 20 of tube 18 is guided past the open end 36 of cup 35 without catching on said open end. Other locators may be provided for final alignment of cover member 11 and base member 22; and the two members may be fastened together by any convenient method.

With the members assembled together into a single case, tube 18 and cup 35 optically isolate photosensitive device 34 from the interior of clock case 10; and conduit member 40 conveys external ambient light from window 14 to photosensitive device 34, whereby the brightness of display tubes 32 may be controlled by appropriate circuitry in response to ambient light conditions outside clock case 10.

The embodiment shown and described above is but one of many equivalent embodiments that will occur to those skilled in the art. Therefore, this invention should be limited only by the claim which follows.

The embodiments of the invention in which an exclusive property or privilege is claimed are defined as follows:

1. A containing case and ambient light conduit assembly for a luminous display in a motor vehicle instrument panel wherein the display brightness may be controlled according to ambient light intensity, the assembly comprising, in combination:

a generally opaque cover member having an ambient light admitting window and an opaque tube extending from the back of said member and surrounding said window, the tube having an outwardly tapering inner diameter;

a base member including therein a photosensitive device in a cup having an open axial end adapted to face and align with the tube of the cover member, said tube being of such length and diameter as to overlap the cup when the cover and base members are assembled together, whereby the interior of the tube and cup are isolated optically from the display;

a light conducting conduit member having a step-down diameter end portion adapted for retention in the cup and a main portion having a diameter being at least as large as the cup outer diameter adjacent the cup and tapering to fit the tube inner diameter along its axial length, the conduit member extending from the cup to the window, whereby the light conduit member functions both as a conduit for ambient light from outside the case to the photosensitive device and as an assembly aid in aligning the base and cover members.

* * * * *